United States Patent [19]

Cutler et al.

[11] 4,302,713
[45] Nov. 24, 1981

[54] FIXED GATING SEQUENCE APPARATUS AND METHOD FOR AN INVERTER

[75] Inventors: John H. Cutler, Roanoke; Loren H. Walker, Salem, both of Va.

[73] Assignee: General Electric Company, Salem, Va.

[21] Appl. No.: 32,894

[22] Filed: Apr. 24, 1979

[51] Int. Cl.³ .............................................. H02M 1/18
[52] U.S. Cl. .................................. 318/801; 318/805; 318/808; 363/96; 318/436
[58] Field of Search ................................. 318/798–803, 318/805, 807–811, 436; 363/96, 42, 49

[56] References Cited

U.S. PATENT DOCUMENTS

| | | | |
|---|---|---|---|
| 3,364,413 | 1/1968 | Abraham | 363/96 |
| 4,030,019 | 6/1977 | Bailey | 321/45 R |
| 4,151,586 | 4/1979 | Udvardi-Lakos | 363/57 |
| 4,195,233 | 3/1980 | Udvardi-Lakos | 307/66 |

Primary Examiner—B. Dobeck
Attorney, Agent, or Firm—Arnold E. Renner

[57] ABSTRACT

A fixed gating sequence apparatus and method for an inverter is disclosed. In one aspect of the invention, an outgoing signal of variable frequency is generated by the inverter in response to gating signals provided by an inverter control. The gating signals effectively are provided by a shift register of an inverter control to the gates of the conduction controlled rectifying devices in the inverter in response to a clocking signal. The clocking signal is provided to the clock input of the shift register at a normal system rate when an idle condition (idle control signal) is not present and at a predetermined cycling rate from when the idle condition occurs until a desired fixed gating pattern effectively is provided by the shift register to the inverter. The shift register remains at the stage providing the desired fixed gating pattern until the idle condition no longer is present, whereupon the normal clocking signals are again provided to the shift register. In another aspect, the gating signals, which effectively are normally supplied to the conduction controlled rectifying devices of the inverter, are blocked or inhibited from when the idle condition occurs until the desired fixed gating pattern is provided by the shift register of the control stage of the inverter. Thus, in this aspect, the inverter does not produce a moderate frequency burst of outgoing signal when the shift register cycles through and stops at the desired fixed gating pattern.

15 Claims, 6 Drawing Figures

PRIOR ART
FIG.1

TABLE 1

| REGISTER | THYRISTORS |
|---|---|
| 112 | $P_1$ |
| 114 | $N_3$ |
| 116 | $P_2$ |
| 118 | $N_1$ |
| 120 | $P_3$ |
| 122 | $N_2$ |

TABLE 2

| REGISTER | THYRISTORS |
|---|---|
| 112 | $P_1$ & $N_2$ |
| 114 | $P_1$ & $N_3$ |
| 116 | $P_2$ & $N_3$ |
| 118 | $P_2$ & $N_1$ |
| 120 | $P_3$ & $N_1$ |
| 122 | $P_3$ & $N_2$ |

FIXED GATING SEQUENCE APPARATUS AND METHOD FOR AN INVERTER

BACKGROUND OF THE INVENTION

1. Field of the Invention

The present invention relates generally to control apparatus and methods for generating with an inverter an outgoing signal of variable magnitude and frequency and, more particularly, to an apparatus and method which in one aspect causes the inverter to be cycled to and stopped at a preselected gating sequence when an idle condition occurs, and which in another aspect causes the gating pulse signals effectively not to be provided to the inverter from when the idle condition occurs until a designated one of the gating pulse signals is furnished.

2. Prior Art

Methods and apparatus are well known for generating an outgoing signal of variable magnitude and frequency in accordance with control signals. One such well-known approach is the use of an inverter that converts an incoming DC signal to an outgoing signal of variable magnitude and frequency in accordance with control signals. In one of the more common three-phase versions of the inverter, variable direct current (DC) power is applied to a six conduction controlled rectifying device bridge having a pair of series conduction controlled rectifying devices, such as thyristors, associated with each leg of the three-phase outgoing signal. Control signals, such as gating pulse signals, are effectively supplied to the gating terminals, or gates, of the conduction controlled rectifying devices in the inverter. The gating pulse signals cause respective ones of the conduction controlled rectifying devices to which they are effectively supplied to go to the conduction state, causing the outgoing signal of desired magnitude and frequency to be generated.

It is often desirable to cause the inverter to generate an outgoing signal in accordance with certain of the conduction controlled rectifying devices being in the conduction or gated state when, for example, the frequency of the outgoing signal is below a preselected level indicative of a low load operation. In the case of an inverter used to generate an outgoing signal provided to drive an AC electric motor, it often is important to be able to provide the outgoing signal to particular stator windings when the frequency of the outgoing signal is below a preselected value, for example, substantially zero Hertz, so that the orientation and magnitude of the flux produced by the DC outgoing signal is known.

Conventional inverters and their associated control circuitries, however, do not assure that certain thyristors are in the conduction state when the frequency of the outgoing signal is below the preselected value (indicative of low load operation) because the inverter is randomly stopped at any position of thyristors in the conduction or gated state. When the preselected frequency value is substantially zero Hertz indicative of an idle state, it becomes unlikely for the system ever to reach the desired gated thyristor pattern in the inverter if this desired gated state of thyristors is stopped at random because the outgoing signal is substantially DC and, therefore, no further gating of the inverter thyristors takes place.

It is also desirable to cause the inverter not to receive gating signals when the frequency of the outgoing signal goes below the preselected value (indicative of low operation load) until a designated one or group of the gating signals is furnished by the inverter control circuitry. By blanking the gating signals, the inverter is prevented from cycling through its conduction or gated states, and consequently providing an outgoing signal at relatively high frequency, when the conduction state of the thyristors of the inverter is shifted from the conduction state at which the inverter was randomly stopped until the designated one of the gating signals is furnished by the control circuitry of the inverter. Conventional inverters do not provide this capability of blanking the gating pulse signals from when the inverter is forced into the idle state until the designated pattern of gating signals is furnished by the control circuitry associated therewith.

OBJECTS OF THE INVENTION

It is an object of the present invention to provide an apparatus and method for causing an inverter, when sequencing into an idle condition, to provide an outgoing signal of variable magnitude and frequency in accordance with a desired fixed gating sequence of the conduction controlled rectifying devices in the inverter.

It is another object of the present invention to cause the shift register of the control circuit of the inverter to cycle to and stop at a desired fixed gating position, irrespective of the gating sequence being provided by the shift register when the inverter first entered the idle condition.

It is another object of the present invention to provide an apparatus and method for not furnishing the gating signals provided by the shift register of the control circuit to the inverter from when the inverter goes to the idle state until the desired fixed gating pattern is provided by the shift register.

It is a further object of the present invention to provide an apparatus and method for the control circuit effective to cause the inverter to cycle directly to the desired conduction state after the idle condition occurs without the inverter providing an output signal of substantial magnitude and/or frequency.

These and other objects have been achieved by the apparatus and method of the present invention.

SUMMARY OF THE INVENTION

A fixed gating sequence apparatus and method is disclosed for a control circuit of an inverter, which inverter generates an outgoing signal of variable magnitude and frequency in accordance with gating signals from the control circuit provided to the conduction controlled rectifying devices of the inverter.

In one aspect, the present invention causes the inverter to generate the outgoing signal in accordance with a desired fixed gating sequence of the conduction controlled rectifying devices of the inverter, irrespective of the gating sequence provided by the shift register of the control circuit when an idle state occurs.

Gating signals to the inverter are provided by the shift register of the control circuit in response to a clocking signal. The clocking signal is provided, for example, by a voltage controlled oscillator, at a rate set in accordance with a frequency control signal when an idle control signal (indicative of an idle control state) is absent. When the idle control signal is present, the clocking signal is provided at a cycling rate set in accordance with voltage signals of predetermined magnitude until the shift register provides the desired fixed gating sequence to the inverter, whereupon the clocking signal is no longer provided to the shift register causing it to stop at the stage which furnishes the desired fixed gating pattern. The shift register remains unchanged until the idle condition is no longer present, whereupon the shift register is again provided a clocking signal at a rate set in accordance with the frequency control signal.

In another aspect of the present invention, the gating signals from the shift register effectively are not provided to the inverter from when the idle condition occurs until the desired fixed gating sequence is provided by the shift register. In one embodiment, gating means, such as electronic switches, are connected between the lines from each of the stages of the shift register (except the stage which provides the desired fixed gating sequence) and the respective gate drives. The gating means are normally in the closed state, but are adapted to be switched to the open state in response to an inhibiting signal provided from when the idle condition occurs until the desired fixed gating sequence is provided by the shift register. The gating means thus act to blank the gating sequences provided by the shift register from when idle condition occurs until the desired fixed gating sequence is provided.

The present invention in both of its aspects has particular application in an AC electric motor drive system having an AC electric motor producing a rotation in response to an outgoing signal of variable magnitude and frequency.

DETAILED DESCRIPTION OF THE INVENTION

Figure 1:
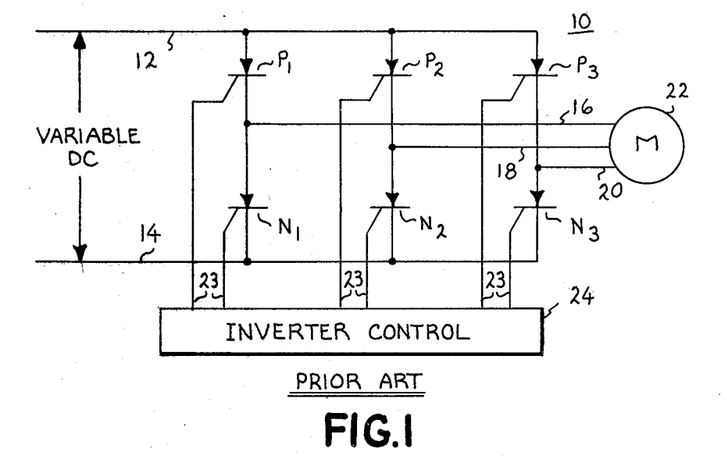
FIG. 1 is a schematic diagram of a basic inverter circuit as known in the art and such as is preferably used in the present invention.

Referring now to FIG. 1, an inverter system as is known in the prior art and such as is generally applicable to the present invention is shown in basic schematic form. The inverter system utilizes a plurality of conduction controlled rectifying devices, for example, thyratrons, mercury arc rectifiers such as ignitrons and excitrons, and thyristors. Thyristors are now the most commonly used conduction controlled rectifying device and will be used as a generic term herein. In FIG. 1, only the basic conducting elements have been shown in relationship to the total system, and such things as snubbing circuits, commutating circuits, etc. have been omitted because these do not play any part in the understanding of the present invention.

The system of FIG. 1 includes a three-phase semiconductor bridge 10 which is comprised of three positive thyristors $P_1$, $P_2$ and $P_3$ and three negative thyristors $N_1$, $N_2$ and $N_3$. Bridge 10 is connected to a source of variable DC power by way of a pair of buses 12 and 14. The source can supply variable DC voltage and/or current in accordance with the nature of the actual operational status of bridge 10. As well as being grouped as positive and negative thyristors, grouping of the thyristors of the inverter system may also be made according to phase. Line 16 is connected at the junction of the series connected thyristors $P_1$ and $N_1$ as a first phase input to a load 22, such as an AC electric motor, while thyristors $P_2$ and $N_2$ are connected by way of phase line 18 to the load. In a similar manner, the third leg of the bridge, comprising series connected thyristors $P_3$ and $N_3$, is connected by way of phase line 20 to the load.

In the illustrative embodiment of the inverter system of FIG. 1, the thyristors are rendered conductive by the appropriate application thereto of gating pulse signals on leads 23 connected to the gate electrodes of each of the thyristors. The actual gating pulse signals are developed by an inverter control 24, the nature of which will be determined in accordance with the type and overall desired function of the inverter.

Figure 2:
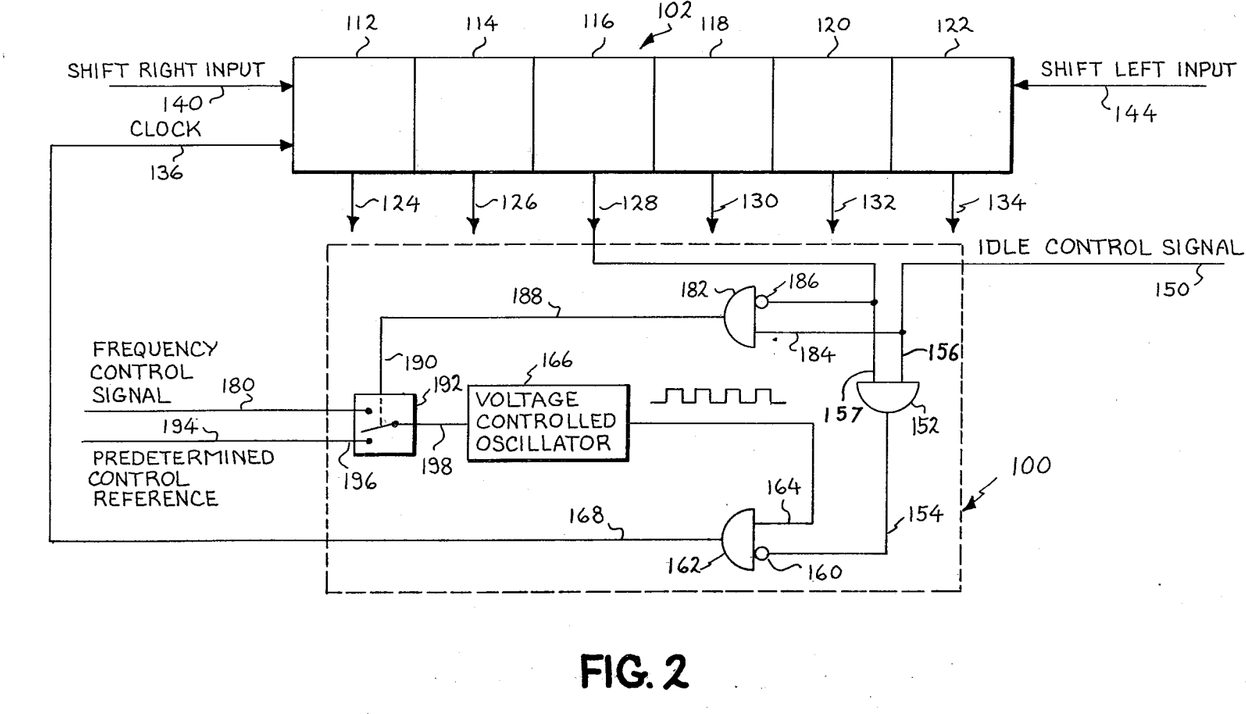
FIG. 2 is a schematic diagram showing the fundaments of a control system for the inverter of FIG. 1 and showing an embodiment of the present invention associated therewith within dashed-line box 100.

Referring now to FIG. 2, one well-known version of the inverter control 24 used in inverter systems like that depicted in FIG. 1 is shown in fundamental form by the circuitry outside dashed-line box 100; the circuitry within dashed-line box 100 makes up one aspect of the present invention and is discussed below in detail.

A shift register 102, shown in a generic form in FIG. 2, includes, for example, six stages, designated respectively stages 112, 114, 116, 118, 120 and 122. Shift register 102 may be of any suitable type well known in the art, but normally would be comprised of series connected flip-flops such that a digital quantity (typically a binary one) stored in one of the flip-flops, for example, stage 112, is transferred to and stored in stage 114 and thence in stage 116, etc. with each occurrence of a clocking signal or pulse provided to a clock input 136 and a shift right signal furnished to a shift right input 140. (It is noted that right and left herein is referenced with respect to FIG. 2) Conversely, a digital quantity, such as a binary one, stored in, for example, stage 122 is transferred to and stored in stage 120 and thence in stage 118, etc. with each occurrence of a clocking signal or pulse provided to clock input 136 and a shift left signal furnished to a shift left input 144.

Lines 124, 126, 128, 130, 132 and 134, labeled "gating pulse signals", sense the individual binary states of the respective stages 112, 114, 116, 118, 120 and 122 and serve to initiate the respective gating pulse signals for application to respective thyristors of the inverter bridge circuit (FIG. 1). In the typical system, the gating pulse signals via lines 124 through 134 would not be directly applied to the gates of the respective thyristors of the bridge, but would serve to operate gate drivers (not shown) which serve to apply the actual gating pulse signals. This, however, is well known in the art, and further explanation is believed unnecessary.

Figure 3:
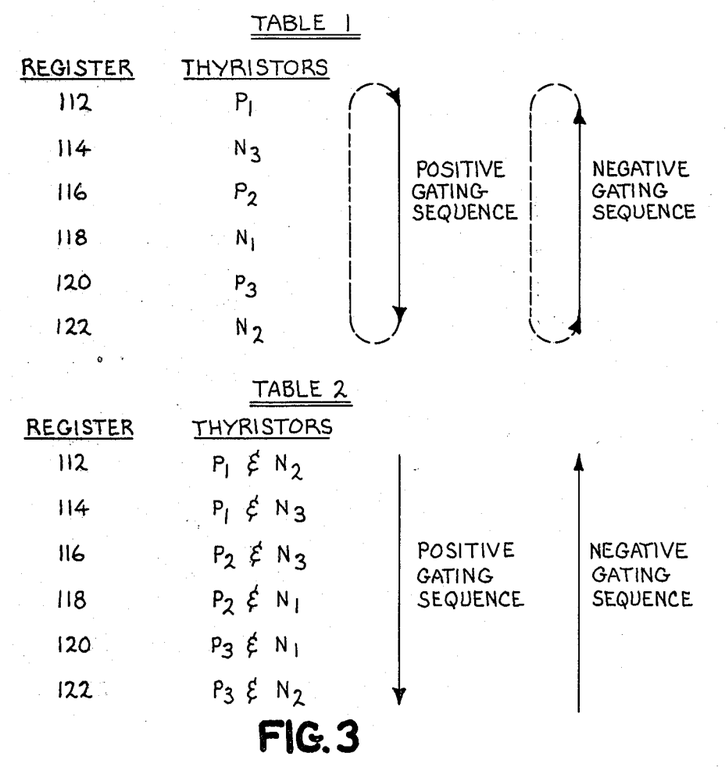
FIG. 3 depicts tables listing typical gating sequence signal patterns as might be used in the system of the present invention.

Since the exact nature of shift register 102 is not important to the present invention, the details of originating the register contents have not been shown. If, for example, the register were of the well-known prior art type employing recirculation, binary ones would be placed in two mutually adjacent stages and recirculated through the register by way of a return path (not shown) at a rage governed by a clock input on line 136 and in a direction in accordance with the presence or absence of direction steering signals on lines 140 and 144 (respectively, "shift right input" and "shift left input"). In this case the relationship between the register stages and the generation of firing signals for the thyristors of bridge 10 (FIG. 1) is a one-to-one basis as shown by Table 1 of FIG. 3.

Preferably, however, the present invention employs a bidirectional open-ended shift register which in response to specified bit patterns within the register automatically loads the register at specified times (first prior to original bridge operation and subsequently during operation) with a single binary one which is, as before, shifted at a rate goverened by the clock input on line 136 and in a direction determined by the signals on lines 140 and 144. This system shifts out and eliminates undesirable or spurious gating signal designations from the shift register and is the subject matter of U.S. Pat. No. 4,258,416, issued Mar. 24, 1981, entitled "Inverter Power Conversion System Having Improved Control Scheme", to Loren H. Walker and John H. Cutler, assigned to the assignee of the present invention, and incorporated herein by reference. The relationship between register content and the gating of the bridge thyristors in this case is illustrated by Table 2 of FIG. 3.

In one aspect, the present invention provides an apparatus and method for effectively causing the generation of the outgoing signal to be in accordance with a predetermined gating signal effectively applied to respective thyristors of the inverter when an idle condition occurs, irrespective of the gating sequence at which shift register 102 is randomly stopped at when the idle condition first occurs.

The idle condition is indicative of low load operation. It can take several forms, including the condition where the frequency of the outgoing signal is below a preselected frequency value, for example, less than or equal to 3 Hertz. Typically, the preselected frequency value is approximately zero Hertz. As is shown with respect to the use of the present invention with the AC electric motor drive systems of FIGS. 5 and 6, discussed below, the idle condition can occur when specific system parameters are less than respective preselected values. Specifically, with regard to the AC electric motor drive system of FIG. 5 employing a desired level of rotation, the idle condition is present when the torque command signal and at least two of the rotation reference signal, the actual rotation signal, and the rotation difference signal are less than respective preselected values. With respect to the AC electric motor drive system of FIG. 6 employing a desired level of torque, the idle condition exists when the torque reference signal and the actual rotation signal are less than respective predetermined values. When the idle condition occurs in accordance with any of these parameter schemes, an idle signal is generated. This system of developing the idle signal forms the subject matter of copending patent application Ser. No. 032,855 "Zero Rotation And Zero Torque Detector And Method For An AC Electric Motor Drive" by Loren H. Walker and John H. Cutler filed on same day as the present invention, assigned to the assignee of the present invention and incorporated herein by reference.

The circuitry within dashed-line box 100 of FIG. 2 is one embodiment of the apparatus and method of the present invention in accordance with the first aspect. For purposes of illustration, a desired fixed gating sequence is assumed to be the gating sequence supplied by stage 116 on line 128. A first logic stage, which includes an AND gate 152 of conventional design, provides a first control signal at an output 154 when the idle signal supplied to a line 150 connected to a first input 156 is true (a binary one) and the predetermined gating signal supplied by stage 116 via line 128 to a second input 157 is also a binary one. Absent either of these two conditions, the output on line 154 is in the false or binary zero state. Thus, gate 152 provides a signal in the false, or binary zero, state on line 154 except when the idle control signal on line 150 is in the true (binary one) state and the predetermined gating signal is provided by stage 116.

Output line 154 is connected to a first input (inverting) 160 of a second logic stage, designated generally by reference numeral 162. Second logic stage, for example, can be an AND gate. A second input 164 of the gate 162 is connected to a source of the clocking signal. The source of the clocking signal can be of any suitable type; for example, the clocking signal can be a serial stream of clocking pulses of controllable rate. One suitable form for the source of the clocking signal is a voltage controlled oscillator 166 of conventional design, which provides the clocking signal to the second input 164 at a rate controlled in accordance with the voltage magnitude of a control signal supplied on a line 198 which, in turn has a value determined by the position of a switch 192 as will be explained.

Line 150 is also connected to a noninverting input 184 of an AND gate 182. An inverting input 186 of gate 182 is connected to line 128. AND gate 182 provides a signal on an output line 188 in the true (binary one) state when the idle control signal is true and the predetermined gating signal is not provided by stage 116 via line 128.

Output line 188 is connected to a control input 190 of an electronic switch 192 of conventional design. The output of switch 192 has one of two values as determined by its position under the control at input 190. A voltage signal having a predetermined magnitude (corresponding to a clocking rate desired during entry into the idle condition) is supplied by line 194. For example, the voltage signal (line 194) can have a predetermined magnitude so that the voltage controlled oscillator 166 is caused to provide a clocking signal of a predetermined rate; e.g., corresponding to 12 Hertz. Switch 192 provides the voltage signal of predetermined magnitude on an output line 198 when the signal on line 188 is in the true state.

The output signal on an output 168 of the gate 162 is provided to the clock input 136 of shift register 102. The clocking signal from voltage controlled oscillator 166 at a rate set in accordance with the frequency control signal is normally supplied by second logic stage 162 to clock input 136 when the idle control signal is absent and at a different cycling rate in accordance with the voltage signal of predetermined magnitude on line 194 from when the idle control signal is first provided until the desired fixed gating signal is supplied on line 128 by shift register 102 (during which cycling time period the frequency control signal may be forced to zero, as discussed with regard to FIGS. 5 and 6).

The operation of the embodiment of the present invention shown in FIG. 2 is now explained. Assume operation of shift register 102 with no idle control signal is present on line 150. The output from gate 152, provided to input 160, is in the false state allowing the clocking signal from voltage controlled oscillator 166 set in accordance with the frequency control signal to be supplied via output 168 to clock input 136 of shift register 102. When the idle signal is initially provided on line 150, the frequency control signal is typically of a value causing voltage controlled oscillator 166 to provide a clocking signal of substantially zero frequency, and this signal is still being provided to clock input 136. Thus, shift register 102 is momentarily prevented from cycling and provides a random gating sequence that has a high probability of not being the desired fixed gating position. However, the voltage signal of predetermined magnitude (line 194) is immediately thereafter provided to voltage controlled oscillator 166 causing it to provide clocking signals at a moderate shift frequency; e.g., corresponding to 12 Hertz, to clock input 136. This clocking signal on clock input 136 causes shift register 102 to shift through the gating sequences until the desired fixed gating position is provided on line 128, whereupon the present invention no longer allows the shift register 102 to shift because the output of gate 152 changes to the true state and gate 162 prevents pulses on line 164 from reaching the clock input 136. The shift register 102 remains at the desired fixed gating position until the idle control signal is no longer provided to line 150, whereupon shift register 102 provides the gating sequences at a rate controlled in accordance with the frequency control signal (line 180). It should be noted that the predetermined frequency set by the voltage signal on line 194 is low enough so that a motor load connected to the inverter (FIG. 1) does not produce appreciable torque as shift register 102 is cycled to and stopped at the desired fixed gating sequence.

In another aspect, the apparatus and method of the present invention inhibits the furnishing of the gating sequence signals from shift register 102 to inverter 10 (FIG. 1) from when the idle control signal condition is provided until the desired fixed gating sequence signals are supplied by the shift register 102.

Figure 4:
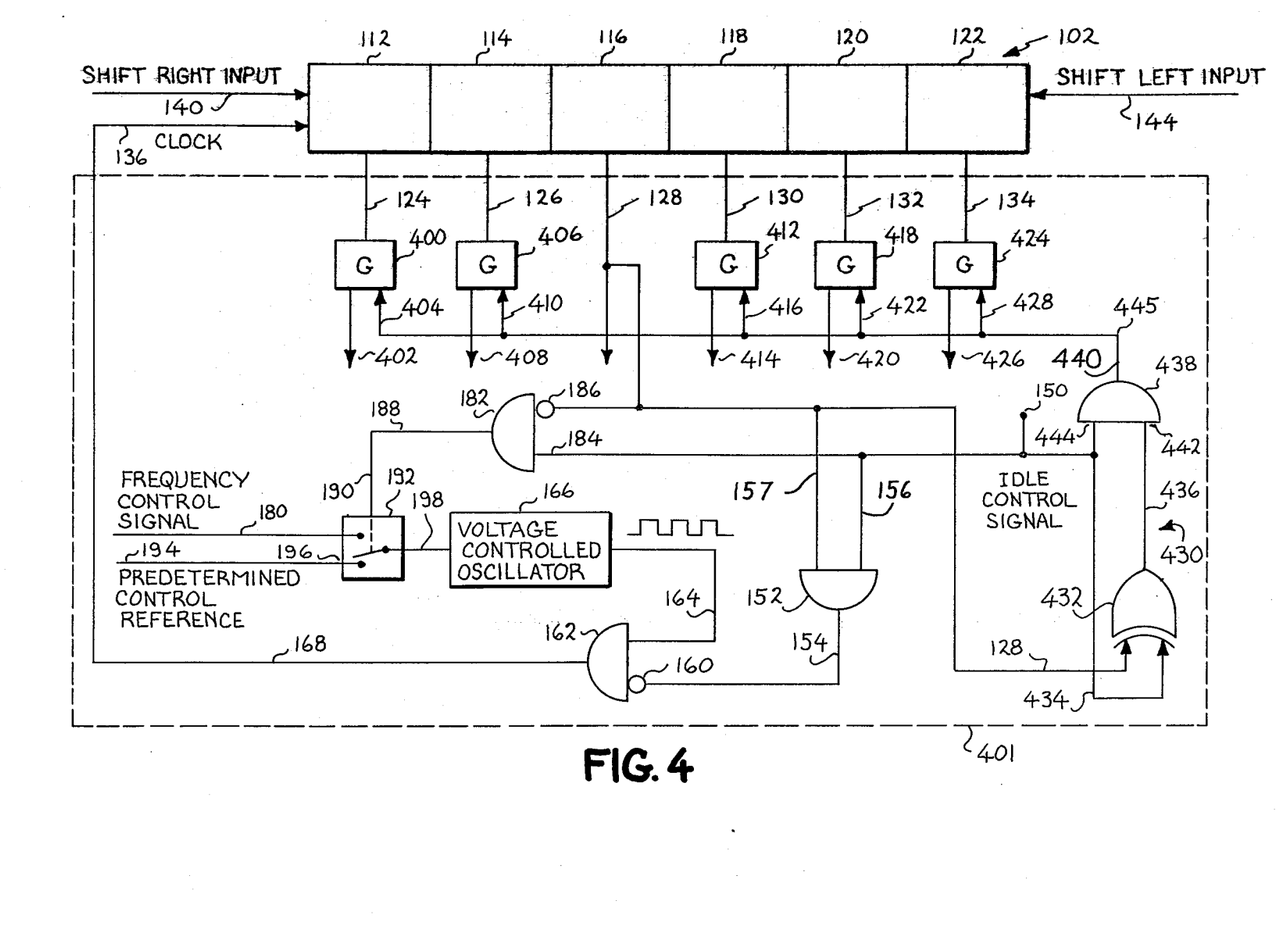
FIG. 4 is a schematic diagram showing the fundaments of a control system for the inverter of FIG. 1 and showing an embodiment of the present invention associated therewith within dashed-line box 401.

Turning now to FIG. 4, an embodiment of the second aspect of the present invention is shown. Like numbers refer to corresponding components in FIGS. 2 and 4, and only the new components of FIG. 4 are discussed.

A switching circuit comprising an individual gate or switch is provided for the respective lines 124, 126, 130, 132 and 134 of stages 112, 114, 118, 120 and 122 of shift register 102. Specifically, a gate or an electronic switch 400 has an input connected to line 124 and an output 402. Switch 400 is normally in the closed state, and is adapted to be switched to the open state when a high state, or inhibiting, signal on a line 445 is furnished to a switching input 404.

A gate, or electronic switch, 406 has an input connected to line 126 and an output 408. Switch 406 is normally in the closed state, but is adapted to be switched to the open state when the high state, or inhibiting, signal is furnished on line 445 to a switching input 410.

As was stated above, for purposes of illustration, stage 116 is designated as the stage providing the predetermined gating signal, which produces the desired fixed gating sequence of inverter 10 when inverter 10 is caused to be in the idle state. Thus, in accordance with the second aspect of the present invention, no switch or gate is interposed on line 128 between stage 116 and the gate driver (not shown).

A gate, or electronic switch, 412 has an input connected to line 130 and an output 414. Switch 412 is normally in the closed state, but is adapted to be switched to the open state when a high state, or inhibiting, signal is furnished on line 445 to a switching input 416.

A gate, or electronic switch, 418 has an input connected to line 132 and an output 420. Switch 418 is normally in the closed state, but is adapted to be switched to the open state when a high state, or inhibiting, signal is furnished on line 445 to a switching input 422.

Finally, a gate, or electronic switch, 424 has an input connected to line 134 and an output 426. Switch 424 is normally in the closed state, but is adapted to be switched to the open state when a high state, or inhibiting, signal is furnished on line 445 to a switching input 428.

Electronic switches 400, 406, 412, 418 and 424 can be any suitable type, such as a logic gate, bipolar transistor or field effect transistor switches or electromechanical relays.

The inhibiting or blanking signal supplied via line 445 to switching inputs 404, 410, 416, 422 and 428 is provided to prevent inverter 10 from being furnished gating signals from the time when the idle control signal is first furnished on line 150 until shift register 102 has been cycled to and stopped at the desired fixed gating sequence, causing inverter 10 to generate the outgoing signal in accordance with the desired fixed gating sequence.

The blanking signal is generated by a first logic stage and a second logic stage. The first logic stage generates a first control signal in the high state when either the idle control signal is present on line 150 or when the desired fixed gating sequence signal is furnished on line 128 by shift register 102. Specifically, the first logic stage, designated generally by reference numeral 430, may include, for example, an EXCLUSIVE OR circuit 432. The EXCLUSIVE OR circuit 432 has a first input connected to line 128, which provides the predetermined gating signal. A second input of EXCLUSIVE OR stage 432 is connected to a line 434, on which the idle control signal from line 150 is supplied. An output 436 of EXCLUSIVE OR stage 432 is in the high state when either, but not both, of the inputs are in the high state. Thus, output 436 is not in the high state when the idle control signal and the predetermined gating signal are both in the low state or are both in the high state.

A second logic stage, designated generally by reference numeral 438, provides a high signal on its output 440 when the signals on its first input 442 and the signal on its second input 444 are both in the high state. One suitable form for the logic stage 438 is an AND gate. Output 436 of EXCLUSIVE OR 432 is connected to input 442. The idle signal line 434 is connected to the second input 444. Thus, output line 440 of the second logic stage 438 is in the high state from when the idle control signal is furnished on line 434 until the predetermined gating signal from stage 116 is furnished. It is seen that the second aspect of the present invention prevents inverter 10 from being cycled through its various gating states when the first aspect of the present invention causes it to cycle through to the desired fixed gating sequence after the idle condition occurs.

Figure 5:
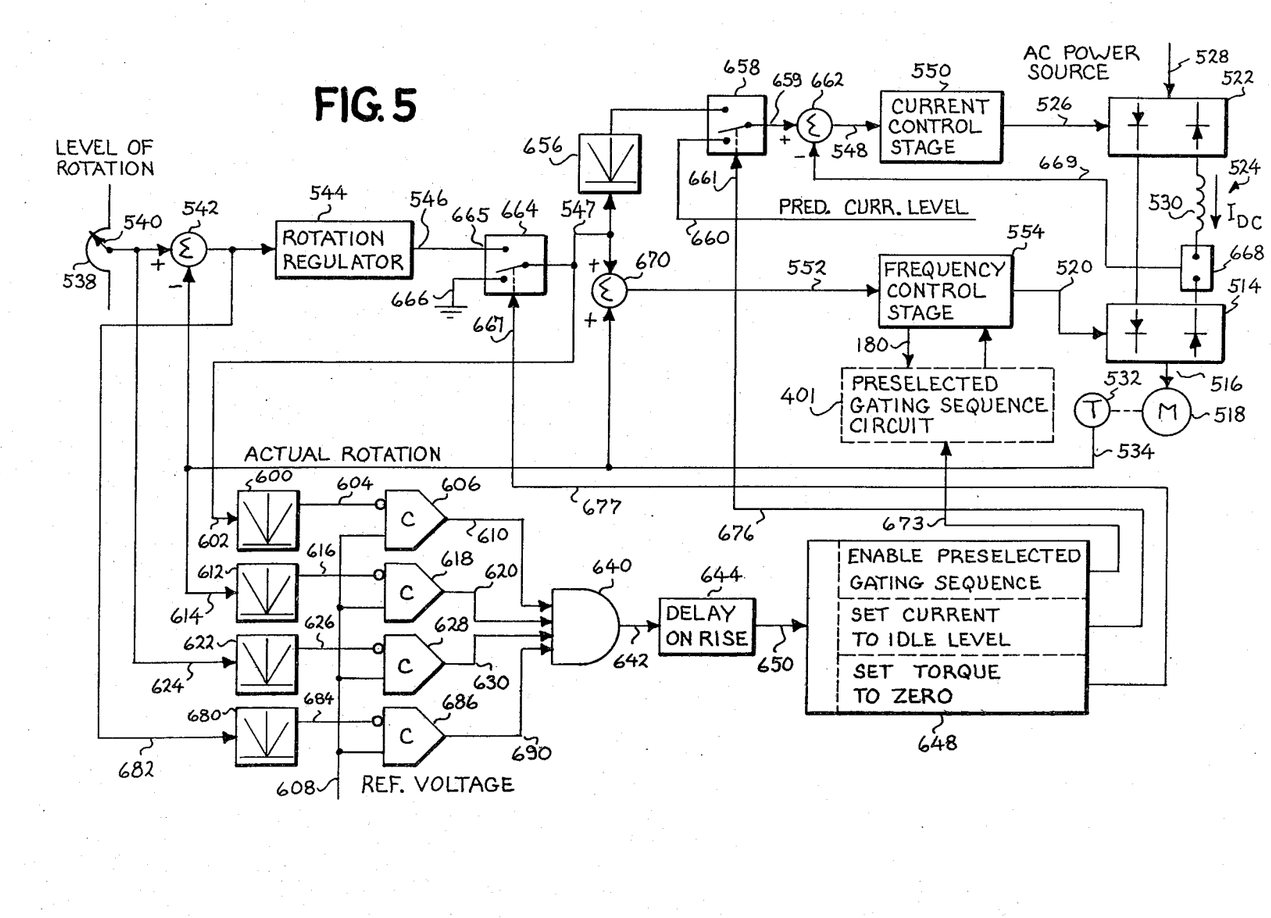
FIG. 5 is a block diagram of an AC electric motor drive system employing a desired level of rotation in which the present invention is utilized.

Turning to FIG. 5, a schematic block diagram of a preferred embodiment is shown of the fixed gating sequence apparatus and method of the present invention utilized in an AC electric motor drive system employing a desired level of rotation. The apparatus of the present invention of the embodiments of FIG. 2 or 4 is principally within dashed-line box 401; the circuitry outside box 401 is a conventional AC electric motor drive system employing a desired level of rotation command.

The apparatus and method of the present invention can be utilized in other types of electric drive systems. The system shown in FIG. 5 is only for purposes of illustration, and is similar to the system disclosed and claimed in U.S. Pat. No. 4,230,979, entitled "Controlled Current Inverter and Motor Control System," to P. M. Espelage et al, issued Oct. 28, 1980, assigned to the assignee of the present invention and incorporated by reference herein. Another suitable electric drive motor system is shown in A. B. Plunkett, D'Atre, J. D., Lipo, T. A., "Synchronous Control of a Static AC Induction Motor Drive," *IEEE/IAS Annual Meeting Conference Record,* 1977, pp. 609-15.

Referring to FIG. 5, a variable frequency inverter 514 (corresponding to inverter 10 of FIG. 1) provides an outgoing signal, such as a drive current, of variable magnitude and frequency via a line 516 to a load, such as AC motor 518. AC motor 518 can be of any suitable type, but preferably is an AC induction motor.

Inverter 514 can be of any suitable type for converting a DC input signal to a drive current of variable frequency under control of a variable frequency gating signal, also referred to as a frequency control signal, on an input line 520. One preferable form for inverter 514 is an autosequentially commutated controlled current inverter having a 6-thyristor bridge, such as inverter 10 of FIG. 1, which generates the drive current of variable magnitude and frequency in accordance with the gating of the thyristors.

The DC input current to inverter 514 can be provided by any suitable variable DC current source. One preferred embodiment for the variable DC current source is a converter 522, which supplies variable magnitude DC current via a DC link 524 to the input of inverter 514. Converter 522 converts AC power supplied through terminals 528 under control of phase controlled gating signals on lines 526 to a DC current of variable magnitude. The phase controlled gating signals are also referred to herein as the current control signal. Converter 522 can be of any suitable type but, most typically, would be a 6-thyristor phase controlled converter whose thyristors are provided with gating pulses by the current control signal on line 526.

The DC current of variable magnitude ($I_{DC}$) is provided to inverter 514 via DC link 524. DC link 524 can take any suitable form, but preferably includes an inductor 530 connected in series between converter 522 and inverter 514. Inductor 530 acts as a filter.

Thus, the magnitude of the drive current supplied by inverter 514 to line 516 is controlled by the current control signal supplied to converter 522, and the frequency of the drive current is varied in accordance with the frequency control signal furnished on line 520 to inverter 514.

The electric motor drive system shown in FIG. 5 is a closed loop system having the following feedback paths. The actual rotation produced by motor 518 is sensed and used to generate an actual rotation signal on a line 534 proportional to the mechanical rotation. One suitable form for generating the actual rotation signal is a DC tachometer 532. Furthermore, other approaches for generating the actual rotation signal are contemplated by this invention.

A desired level of rotation is used to establish a rotation reference signal proportional thereto. The desired level of rotation can be furnished from either a system or user command; and most typically is in the form of a rotation user command from an operator settable rheostat 538 having a wiper arm 540 connected to a user or operator rotation control lever (not shown).

The rotation reference signal from wiper arm 540 is provided to a first input of a summing junction 542. The actual rotation signal is negatively fed back and provided to a second input of summing junction 542. The output of summing junction 542 is a rotation difference signal, which is representative of any difference between the rotation reference signal and the actual rotation signal and is provided to the input of a rotation regulator 544. Rotation regulator 544 can be of any suitable type to generate on a line 546 a torque command signal as a function of the rotation difference signal. One suitable form for rotation regulator 544 is an operational amplifier configured to operate as a gain amplifier having, for example, a transfer function of $$k \frac{1+st}{s},$$

where s is a LaPlace operator, t is a time constant, and k is a gain constant.

Line 546 is connected to the input 665 of an electronic switch 664. Electronic switch 664 is adopted to connect its output 666 effectively to electrical ground in response to a switching signal or idle control signal applied to a switching input 667 so as to cause the torque command signal effectively to assume a substantially zero value. Electronic switch 664 can be of any suitable type, such as a bipolar transistor or field effect transistor switch or an electromechanical relay.

The torque command signal is applied via switch 664 to the input of an absolute value stage 656 of conventional design. The absolute value version of the torque command signal at the output of the absolute value stage 656 is applied to the input of an electronic switch 658. Electronic switch 658 normally connects its input to a first output 659, but is adapted to connect its first output 659 to a second input 660 in response to a switch signal or idle control signal applied to a switching input 661. Electronic switch 658 can be of any suitable type, such as a bipolar transistor or field effect transistor switch or an electromechanical relay. When the first output 659 of electronic switch 658 is caused to be connected to the second input 660, the level of the torque command at the first output 659 is caused to be forced to a level corresponding to a predetermined current level, whereby the magnitude of the drive current is forced to a predetermined level.

The first output 659 is applied to the first input of a summer 662 of conventional design. A shunt 668 is connected to sense the magnitude of the DC current ($I_{DC}$) through the inductor 530 connected to inverter 514. Shunt 668 provides on a line 669 a signal indicative of this magnitude level. The signal on line 669 is negatively fed back and provided to a second input of summer 662. The output of summer 662 provides to an input 548 of a current control stage 550 a signal representative of the difference between the absolute value version of the torque command signal and the signal indicative of the magnitude of the DC current ($I_{DC}$).

Current control stage 550 can be of any suitable type for generating the current control signal on line 526 in accordance with the signal at input 548. One suitable form for current control stage 550 is that of a ramp and pedestal gating control of conventional design.

The torque command signal on line 547 is also applied to the first input of a summer 670 of conventional design. The actual rotation signal is positively fed back and provided to a second input of summer 670. The output of summer 670, which is a signal proportional to the sum of the torque command signal and the actual rotation signal, is provided to input 552 of frequency control stage 554. Frequency control stage 554 can be of any suitable type for generating the frequency control signal as a function of the signal proportional to the sum of the torque command signal and the actual rotation signal. The frequency control signal is provided to line 180 of the preselected gating circuit 401 of the present invention. Circuit 401 is the circuitry depicted, as appropriate, in FIG. 2 or FIG. 4.

The conventional drive system shown in FIG. 5 allows the mechanical rotation and torque generated by AC induction motor 518 to be controlled in accordance with the desired level of rotation.

An idle control signal is furnished in the electric motor drive system of FIG. 5 when the system is in the conventional substantially zero rotation and substantially zero torque mode where the frequency of the drive current is substantially zero. An apparatus and method for furnishing the idle control signal is claimed in U.S. patent application Ser. No. 32,855 entitled "Zero Rotation and Zero Torque Detector and Method for an AC Electric Motor Drive," to Loren H. Walker and John H. Cutler, filed the same day as the present application, assigned to the assignee of the present invention, and incorporated herein by reference.

Figure 6:
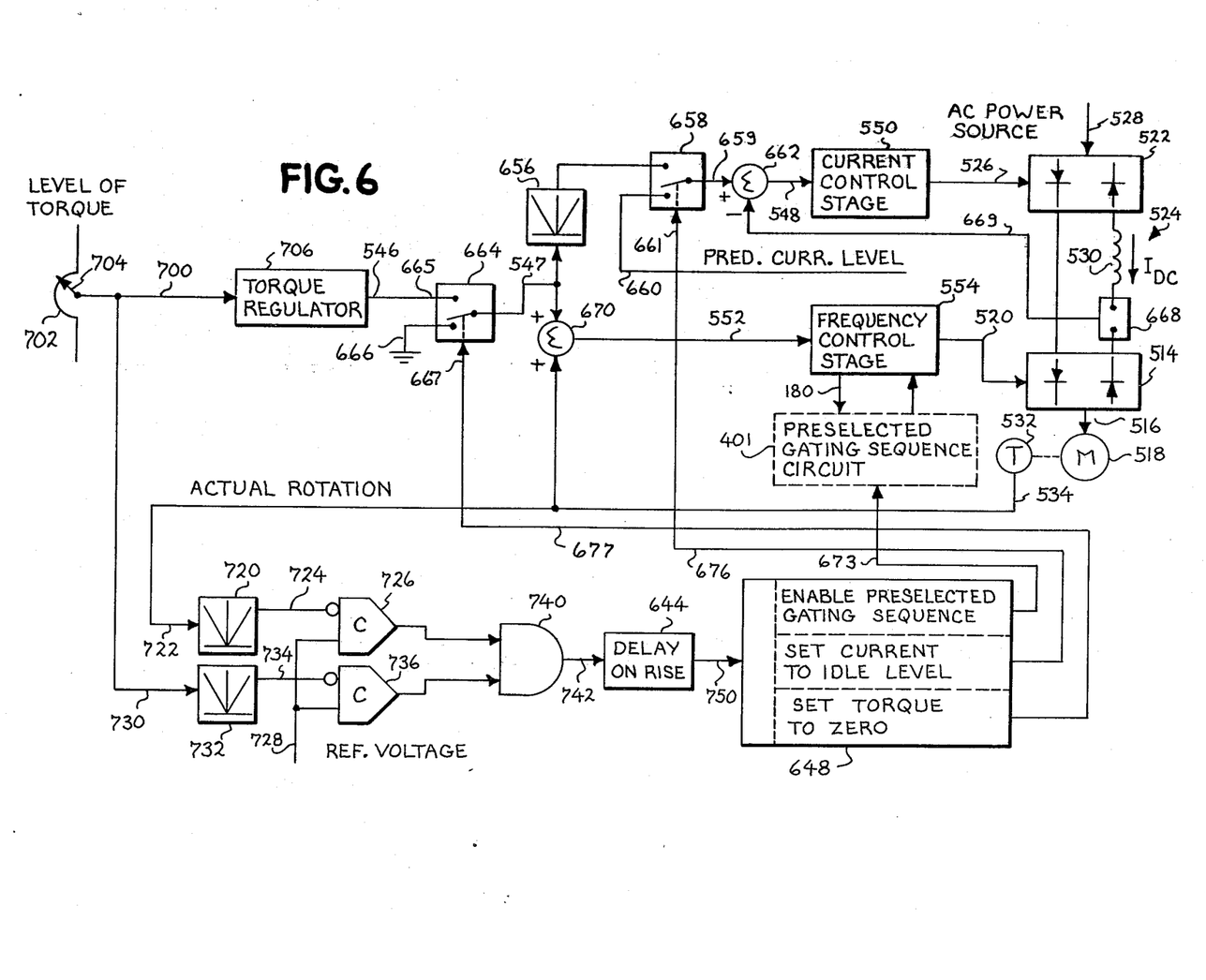
FIG. 6 is a block diagram of an AC electric motor drive system employing a desired level of torque in which the present invention is utilized.

In the case of a drive system utilizing a desired level of rotation, the idle control signal is furnished when the torque reference signal and at least two of the rotation reference signal, the actual rotation signal, and the rotation difference signal are less than respective predetermined values. Alternately, in the case of a drive system utilizing a desired level of torque as shown in FIG. 6, the idle control signal is furnished when the actual rotation signal and the torque reference signal are less than respective predetermined values.

Referring again to FIG. 5, a preferred embodiment of the apparatus of the present invention is shown for a drive system employing a desired level of rotation. An absolute magnitude circuit 600 has an input connected via line 602 to the torque command signal on line 547. Absolute magnitude circuit 600 can be of any suitable type for providing on an output line 604 an absolute magnitude version of the torque command signal.

The absolute magnitude version of the torque command signal is provided to a first input of a voltage comparator 606, whose second input is connected to a source of reference voltage 608. The level of the reference voltage corresponds to the respective predetermined value below which the absolute magnitude version of the torque command signal must have in order for the system to be in the substantially zero rotation and substantially zero torque mode. Reference voltage source 608 can be of any suitable type for generating a reference voltage at the predetermined value.

Voltage comparator 606 can be of any suitable form for furnishing a first output signal on line 610 when the absolute magnitude version of the torque command signal is less than the level of reference voltage source 608. One suitable form for voltage comparator 606 is that of an operational amplifier connection in the voltage comparison mode.

The input of a second absolute magnitude circuit 612 is connected via a line 614 to the actual rotation signal on line 534 for providing an absolute magnitude version of the actual rotation signal on an output line 616. Absolute magnitude stage 612 can take any suitable form. The absolute magnitude version of the actual rotation signal on line 616 is provided to a first input of a voltage comparator 618. The second input of comparator 618 is connected to reference voltage source 608, and provides at an output 620 a second output signal when the magnitude of the absolute magnitude version of the actual rotation signal is less than the level of reference voltage source 608.

The input of a third absolute magnitude circuit 622 is connected via an input line 624 to the rotation reference signal at wiper arm 540. Absolute magnitude circuit 622 provides at an output line 626 an absolute magnitude version of the rotation reference signal. The absolute magnitude version of the rotation reference signal on output line 626 is supplied to a first input of a voltage comparator 628, whose second input is connected to reference voltage source 608. Comparator 628 provides on an output line 630 a third output signal when the absolute magnitude version of the rotation reference signal is less than the level of the reference voltage signal.

The input of a fourth absolute magnitude circuit 680 is connected via a line 682 to the rotation difference signal at the output of summer 542 for providing an absolute magnitude version of the rotation difference signal on an output line 684. Absolute magnitude stage 680 can take any suitable form. The absolute magnitude version of the rotation difference signal on line 684 is provided to a first input of a voltage comparator 686. The second input of comparator 686 is connected to reference voltage source 608, and provides at an output 690 a fourth output signal when the magnitude of the absolute magnitude version of the rotation difference signal is less than the level of reference voltage source 608.

It should be understood that voltage comparators 606, 618, 628 and 686 each could be connected to a different reference signal source providing reference signals of different levels. The use of different reference sources is one way to provide for different predetermined levels below which the torque command signal and at least two of the rotation reference signal, the actual rotation signal, and the rotation difference signal must be in order for the idle control signal to be furnished.

As shown, the output signals from voltage comparators 606, 618, 628 and 684 on lines 610, 620, 630 and 690, respectively, are applied to a logic circuit 640, which furnishes the idle control signal only when the first control signal and two of the second to fourth control signals are present. It should be understood that the present invention can also be configured to provide the idle control signal when each of the first to fourth control signals are present. Normally, only two of the second to fourth control signals are used, however, because the information in the unused control signal is present in the two control signals that are used. Logic circuit 640 can be of any suitable type, such as an AND gate array. The output from logic circuit 640 on line 642 is the idle control signal, and indicates that the drive system is in the substantially zero rotation and substantially zero torque mode of operation.

A delay of predetermined time amount can be introduced before furnishing of the idle control signal to prevent the idle control signal from being generated transiently when the drive system momentarily passes through the conventional substantially zero rotation and substantially zero torque mode. This delay of a predetermined time amount can be produced by applying the idle control signal on line 642 to a delay stage 644 which can be of any suitable design, e.g., a one shot and a gate. Delay stage 644 has a delay on rise and no delay on fall, for example, 0.1 second on rise.

The idle control signal on output line 650 of delay stage 644 causes three functions as represented by block 648. Block 648 represents the three functions produced by the signal on line 650. In structure, block 648 may be nothing more than three lines to conduct the signal on line 650 to the three switches as shown.

The first function represented by block 648 is to provide a switching signal, i.e., the idle control signal on line 673 to block 401 to cause the shift register 102 to be cycled to and stopped at stage 116 to provide the desired fixed gating sequence signal on line 128.

The second function represented by block 648 is to provide a switching signal, i.e., the idle control signal, on a line 676 to electronic switch 658 effectively to cause the magnitude of the drive current to be rapidly changed to a predetermined magnitude level determined by the predetermined current level. The idle control signal on line 676 for rapidly changing the magnitude of the current can cause current control stage 550 arbitrarily to change the current to a preselected magnitude level in accordance with the predetermined current level.

The third function represented by block 648 provides a switching signal, i.e., an idle control signal, on a line 677 to electronic switch 664, causing switch 664 to close so as to reduce rapidly the torque command signal to substantially zero. As is seen in FIG. 5, this reduction to substantially zero is due to electronic switch 664 grounding line 547. The reduction of the torque command signal to zero when the drive system is in the substantially zero rotation and substantially zero torque high slip mode prevents sudden transients in drive system performance from occurring when the drive system exits this mode.

Referring to FIG. 6, a preferred embodiment is shown of the fixed gating apparatus and method for an inverter of the present invention for use in an AC electric motor drive system employing a desired level of torque command. The conventional AC electric motor drive system employing a desired level of torque command shown in FIG. 6 is outside of dashed-line box 401, and is similar to the drive system disclosed in the Espelage et al patent application, U.S. Pat. No. 4,230,979 discussed above. Like numbers in FIGS. 5 and 6 correspond to identical components; only different components are discussed herein.

A torque reference signal proportional to a desired level of torque is provided on a line 700. This torque reference signal can be provided by the drive system, or can be furnished by an operator settable rheostat 702 having a wiper arm 704. The position of wiper arm 704 corresponds to the desired level of torque indicated by the position of a user torque lever (not shown).

The torque reference signal is provided as an input of a torque regulator 706, which generates the torque command signal on line 546 as a function of the torque reference signal. Torque regulator 706 can be of any suitable type to generate the torque command signal in accordance with the torque reference signal. One suitable form for torque regulator 706 is an operational amplifier of conventional design configured to operate as an amplifier exhibiting a suitable gain. The remaining components of the conventional drive system shown in FIG. 6 correspond to the like numbered components of the drive system shown in FIG. 5.

In the drive system employing a desired level of torque, the idle control signal is furnished when the actual rotation signal and the torque reference signal are less than respective predetermined values. The respective predetermined values can be different for the torque command signal and the actual rotation signal, but the values indicate when the drive system is in the conventional substantially zero rotation and substantially zero torque mode when the frequency of the drive current is of a very low value so as to produce the constant slip mode of operation.

Referring again to FIG. 6, the actual rotation signal is applied via line 722 to an absolute magnitude circuit 720. Absolute magnitude circuit 720 can be any suitable type for providing on an output line 724 an absolute magnitude version of the actual rotation signal.

The absolute magnitude version of the actual rotation signal is applied to the first input of a voltage comparator 726. A second input of voltage comparator 726 is connected to a reference voltage source 728, which provides a reference signal at a value equal to the respective predetermined value. Voltage comparator 726 provides a second output signal when the absolute magnitude version of the actual rotation signal is less than the predetermined value. Voltage comparator 726 can be of any suitable type, for example, an operational amplifier connected in the voltage comparison mode.

An input line 730 of an absolute magnitude circuit 732 is connected to the torque reference signal on line 700. Absolute magnitude circuit 732 provides an absolute magnitude version of the torque command signal on a line 734 connected to the first input of a comparator 736. The second input of voltage comparator 736 is connected to reference voltage source 728. Voltage comparator 736 generates a first output signal when the value of the absolute magnitude version of the torque command signal is less than the reference voltage signal equal to the respective predetermined value furnished by reference voltage source 728. Voltage comparator 736 can be of any suitable type, for example, an operational amplifier connected in the voltage comparison mode.

The first output signal from comparator 736 and the second output signal from voltage comparator 726 are applied to a logic circuit 740, which provides the idle control signal as an output on line 742 when both of the two output signals are in the high state. Logic stage 740 can be of any suitable type for providing the idle control signal when each of the two output signals are in the high state, for example, an AND gate.

As in the case of the embodiment shown in FIG. 5, the idle control signal at output 746 of delay stage 644 causes the same three functions to be produced by block 648 as were produced by it in FIG. 5, and they are therefore not discussed again in detail.

While there have been shown and described what are at present considered to be the preferred embodiments of the present invention, modifications thereto will readily occur to those skilled in the art. It is not desired, therefore, that the invention be limited to the specific arrangements shown and described, and it is intended to cover in the appended claims all such modifications as fall within the true spirit and scope of the invention.

What is claimed is:

1. In an inverter system of the type that provides gating signals in a prescribed sequence in response to a selectively applied clocking signal to thereby control the application of electrical power to an associated electric motor, the improvement comprising:
   (a) means for supplying an externally generated idle control signal when a zero speed, zero torque mode of motor operation is desired;
   (b) means for providing gating signals in response to a clocking signal;
   (c) generating means for generating said clocking signal at a controllable rate in response to an externally supplied controllable voltage signal; and at a predetermined rate in response to an externally supplied voltage signal of a predetermined magnitude;
   (d) means for providing said gating signals to said system in response to a one of said gating signals and said idle control signal including,
      (1) first logic means for providing a first control signal except in response to said one of said gating signals and said idle control signal, and
      (2) second logic means for providing said clocking signal to said inverter system except in the absence of said first control signal; and,
   (e) third logic means for providing said voltage signal of a predetermined magnitude to said generating means in response to said idle control signal and in the absence of said one of said gating signals.

2. The inverter apparatus of claim 1, wherein said means for providing gating signals comprises:
   (a) means for generating a data signal; and,
   (b) shift register means having a plurality of stages for storing said data signal in a first stage in response to a clocking signal and for transferring to and storing in adjacent stages said data signal in response to said clocking signal, each stage being adapted to provide the data signal stored thereat as one of said gating signals.

3. The inverter apparatus of claim 1, wherein said gating means does not provide said gating signals in response to said idle control signal except in response to said selected gating signal.

4. An electric motor apparatus having an AC electric motor producing a rotation in response to a drive current of variable magnitude and frequency comprising:
   (a) means for establishing a rotation reference signal proportional to a desired level of rotation;
   (b) means for generating an actual rotation signal proportional to said rotation;
   (c) means for generating a rotation difference signal representative of any difference between said rotation reference signal and said actual rotation signal;
   (d) means for producing a torque command signal in accordance with said rotation difference signal, and for producing a frequency control signal and a current control signal as functions of said torque command signal;
   (e) means for generating a clocking signal in response to said frequency control signal;
   (f) means for providing gating signals in response to said clocking signal;
   (g) means for generating an idle control signal when said torque command signal and at least two of said actual rotation signal, said rotation reference signal and said rotation difference signal are less than respective predetermined levels;
   (h) means for supplying to said motor said drive current at a magnitude varied in accordance with said current control signal and at a frequency controlled in response to said gating signals; and
   (i) means connected to said means for providing gating signals for providing said clocking signal except in response to one of said gating signals and said idle control signal.

5. The apparatus of claim 4, wherein said means for generating a clocking signal comprises:
   (a) means for furnishing said clocking signal at a controllable rate in accordance with a controllable voltage signal;
   (b) a source of a voltage signal of a predetermined magnitude; and,
   (c) logic means for providing said clocking signal in response to said idle control signal and in the absence of one of said gating signals.

6. The apparatus of claim 4, wherein said means for providing gating signals does not provide said gating signals in response to said idle control signal except in response to one of said gating signals.

7. The apparatus of claim 4, wherein said means for providing gating signals comprises:
   (a) first logic means for providing a first control signal in response to either said idle control signal or said predetermined gating signal;
   (b) second logic means for providing a second control signal in response to said first control signal and said idle control signal; and,
   (c) switching means connected to said means for providing gating signals for providing said gating signals to said means for supplying to said motor except in response to said second control signal.

8. The apparatus of claim 4, wherein said means for establishing a rotation reference signal establishes a torque reference signal proportional to a desired level of torque,
   wherein said means for producing a torque command signal produces said torque command signal in accordance with said torque reference signal, and
   wherein said means for generating an idle control signal generates said idle control signal when said torque reference signal and said actual rotation signal are less than respective predetermined levels.

9. The apparatus of claim 8, wherein said means for generating a clocking signal comprises:
   (a) means for furnishing said clocking signal at a controllable rate in accordance with a controllable voltage signal;
   (b) a source of a voltage signal of a predetermined magnitude; and,
   (c) logic means for providing said voltage signal of a predetermined magnitude to said means for furnishing said clocking signal in response to said idle control signal and in the absence of one of said gating signals.

10. The apparatus of claim 8, wherein said means for providing gating signals does not provide said gating signals in response to said idle control signal except in response to one of said gating signals.

11. The apparatus of claim 8, wherein said means for providing gating signals comprises:
    (a) first logic means for providing a first control signal in response to either said idle control signal or said predetermined gating signal;
    (b) second logic means for providing a second control signal in response to said first control signal and said idle control signal; and,
    (c) switching means connected to said means for providing gating signals for providing said gating signals to said means for supplying to said motor except in response to said second control signal.

12. An electric motor method having an AC electric motor producing a rotation in response to a drive current of variable magnitude and frequency comprising the steps of:
    (a) establishing a rotation reference signal proportional to a desired level of rotation;
    (b) generating an actual rotation signal proportional to said rotation;
    (c) generating a rotation difference signal representative of any difference between said rotation reference signal and said actual rotation signal;
    (d) producing a torque command signal in accordance with said rotation difference signal;
    (e) producing a frequency control signal and a current control signal as functions of said torque command signal;
    (f) generating a clocking signal in response to said frequency control signal;
    (g) providing gating signals in response to said clocking signal;
    (h) generating an idle control signal when said torque command signal and at least two of said actual rotation signal, said rotation reference signal and said rotation difference signal are less than respective predetermined levels;
    (i) supplying to said motor said drive current at a magnitude varied in accordance with said current control signal and at a frequency controlled in response to said gating signals; and,
    (j) providing said clocking signal except in response to one of said gating signals and said idle control signal.

13. The method of claim 12, wherein the step of generating a clocking signal comprises the steps of:
    (a) furnishing said clocking signal at a controllable rate in accordance with a controllable voltage signal;
    (b) generating a voltage signal of a predetermined magnitude; and,
    (c) providing said voltage signal of a predetermined magnitude to step (a) in response to said idle control signal and in the absence of one of said gating signals.

14. The method of claim 12, wherein said step of establishing a rotation reference signal establishes a torque reference signal proportional to a desired level of torque,
    wherein said step of producing a torque command signal produces said torque command signal in accordance with said torque reference signal, and wherein said step of generating an idle control signal generates said idle control signal when said torque reference signal and said actual rotation signal are less than respective predetermined levels.

15. The method of claim 14, wherein the step of generating a clocking signal comprises the steps of:
    (a) furnishing said clocking signal at a controllable rate in accordance with a controllable voltage signal;
    (b) generating a voltage signal of a predetermined magnitude; and,
    (c) providing said voltage signal of a predetermined magnitude to step (a) in response to said idle control signal and in the absence of one of said gating signals.

* * * * *